US007335850B2

(12) United States Patent
Kuo

(10) Patent No.: US 7,335,850 B2
(45) Date of Patent: Feb. 26, 2008

(54) PLASMA JET ELECTRODE DEVICE AND SYSTEM THEREOF

(76) Inventor: Yueh-Yun Kuo, 3F-2, No. 536, Mengzih Rd., Zuoying District, Kaohsiung City 813 (TW)

( * ) Notice: Subject to any disclaimer, the term of this patent is extended or adjusted under 35 U.S.C. 154(b) by 0 days.

(21) Appl. No.: 11/695,670

(22) Filed: Apr. 3, 2007

(65) Prior Publication Data

US 2007/0235417 A1 Oct. 11, 2007

(30) Foreign Application Priority Data

Apr. 3, 2000 (TW) .............................. 95111710 A

(51) Int. Cl.
*B23K 10/00* (2006.01)

(52) U.S. Cl. ............................ 219/121.5; 219/121.51; 219/121.48; 219/75; 313/231.41

(58) Field of Classification Search ........... 219/121.36, 219/121.47, 76.16, 74, 75, 121.5, 121.51, 219/121.52, 121.48, 121.54; 313/231.31, 313/231.41

See application file for complete search history.

(56) References Cited

U.S. PATENT DOCUMENTS

| | | | | |
|---|---|---|---|---|
| 5,440,094 | A * | 8/1995 | Zapletal | 219/121.52 |
| 6,800,336 | B1 * | 10/2004 | Fornsel et al. | 427/562 |
| 6,841,754 | B2 * | 1/2005 | Cook et al. | 219/121.48 |
| 6,881,386 | B2 * | 4/2005 | Rabinovich et al. | 422/186.04 |
| 2002/0105408 | A1 * | 8/2002 | Aoki et al. | 338/308 |

* cited by examiner

*Primary Examiner*—Mark Paschall

(57) ABSTRACT

A plasma jet electrode device includes an orientation base, a ceramic pipe, a round plate having a plurality of tilted through holes thereon and a high-voltage metal electrode. A dielectric discharging plasma area is formed between the high-voltage metal electrode and the ceramic pipe. The plasma jet electrode device further has a rotating base, a bottom plate, and a grounding electrode. A low-temperature non-equilibrium plasma area is formed between the grounding electrode and the high-voltage metal electrode. The round plate has a spray head praying low-temperature non-equilibrium plasma. The plasma treatment area is increased, and the uniformity is improved. The present plasma jet electrode system has a frame for fixing at least one plasma jet electrode device. It evidently increases the effective plasma treatment area. The system can also provide additional functions of cooling, guiding, plating and etching, etc.

21 Claims, 9 Drawing Sheets

PLASMA JET ELECTRODE DEVICE AND SYSTEM THEREOF

FIELD OF THE INVENTION

The present invention relates to plasma jet electrode devices, and more particularly to a plasma jet electrode device, which can produce non-balance plasma spraying flow in a low temperature and atmospheric pressure to increase the plasma treatment area and improve the uniformity such that the surface treatment effect of work-pieces can be improved.

DESCRIPTION OF THE RELATED ART

Recently, gas-state oxidized methods for removing contaminations, which use a gas dissociating (plasma) principle, are widely studied and developed, such as electron beam methods, corona discharge methods, microwave methods, radio frequency (RF) methods, dielectric barrier discharge (DBD) methods, etc. The above methods have been approved to have a certain treatment effect. Furthermore, the dielectric barrier discharge methods can effectively discharge under an atmospheric pressure, and have a low cost, so that the dielectric barrier discharge methods have been widely used in plastic film printed treatments, ore static filter segregators, ozone producers, surface modification, surface cleaning, radioactive waste, exhausting waste gas, etc. However, the non-thermal plasma thereof is in a high temperature state, and has disadvantages of arranging at a place and an uniformity of the treatment effect for treating surfaces of work-pieces.

What is needed, therefore, is a plasma jet electrode device having an excellent treatment effect.

BRIEF SUMMARY

A plasma jet electrode device in accordance with a preferred embodiment, includes a orientation base, a ceramic pipe arranged in the orientation base, a round plate having at least tilted through holes arranged thereon arranged in the ceramic pipe, a high-voltage metal electrode arranged in the round plate, a dielectric discharging plasma area formed between the high-voltage metal electrode and the ceramic pipe, a rotating base arranged around the orientation base, a bottom plate arranged under the rotating base, a grounding electrode arranged on the inner surface of the bottom plate, a low-temperature non-equilibrium plasma area formed between the grounding electrode and the high-voltage metal electrode, a spray head arranged under the bottom plate for spraying low-temperature non-equilibrium plasma. The spray head has a plurality of tilted through holes arranged thereon.

The plasma jet electrode device can use a wire connected to a power for supplying an alternating high-frequency high voltage on the high-voltage metal electrode, and make the bottom plate connected with ground. The low-temperature air and the plasma manufacturing gas enter from the windpipe, and pass through the plasma of the dielectric discharging plasma area from the tilted through holes arranged on the round plate to produce a turbulent flow and spray the plasma. Then the spraying plasma changes to a low-temperature non-equilibrium plasma in the low-temperature non-equilibrium plasma area. The low-temperature non-equilibrium plasma is sprayed through the rotating spray head and the tilted through holes to increase the treatment area and the uniformity of the plasma.

Other objects, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe a preferred embodiment of the present plasma jet electrode device, in detail.

Figure 1:
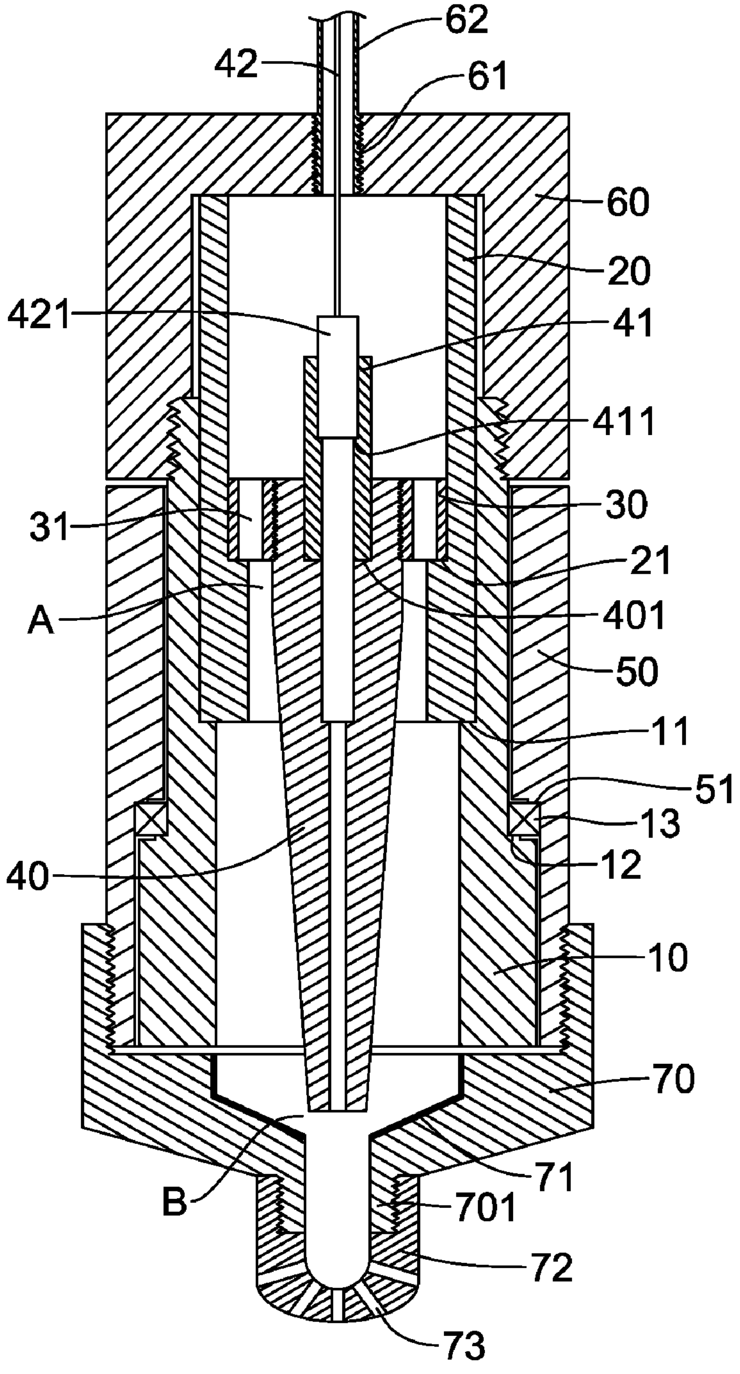
FIG. 1 is a schematic, cross-sectional view of a plasma jet electrode device in accordance with a preferred embodiment of the present invention.
Figure 2:
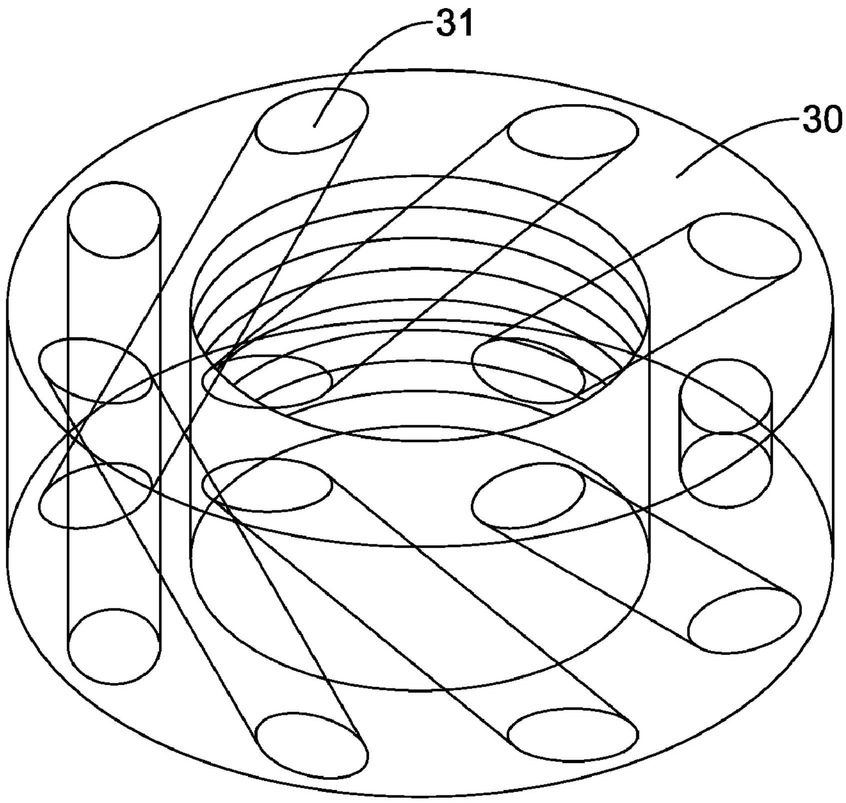
FIG. 2 is a schematic, 3-dimensional view of a round plate of the plasma jet electrode device.

Referring to FIGS. 1 and 2, a plasma jet electrode device in accordance with a preferred embodiment of the present invention is shown. The plasma jet electrode device includes a orientation base 10, a ceramic pipe 20 arranged in the orientation base 10, a round plate 30 arranged in the ceramic pipe 30, a plurality of tilted through holes 31 arranged on the round plate 30, a high-voltage metal electrode 40 arranged on the round plate 30, a dielectric discharging area A formed between the high-voltage metal electrode 40 and the ceramic pipe 20, and a coping 60 arranged on the orientation base 10. The high-voltage metal electrode 40 is a hollow column for heat dissipating. A screw hole 61 is arranged in the coping 60, and a windpipe 62 is arranged in the screw hole 61. The high-voltage metal electrode 40 has a tie-in 421 arranged on the top thereof, and the tie-in 421 connects with a wire 42, which is inserted in the windpipe 62 and connects with a high-voltage terminal. A gap is formed between the windpipe 62 and the wire 42 for outside air and the plasma manufacturing gas entering through windpipe 62 into the ceramic pipe 20 to make reactions.

The plasma manufacturing gases, which enter through windpipe 62 into the ceramic pipe 20, may be air, argon (Ar), carbon dioxide ($CO_2$), nitrogen ($N_2$), helium (He), oxygen ($O_2$), or their combinations.

The plasma jet electrode device further includes a rotating base 50 arranged around the orientation base 10, a bottom plate 70 under the rotating base 50, and a grounding electrode 71 arranged on the inner surface of the bottom plate 70. A low-temperature non-equilibrium plasma area B is formed between the grounding electrode 71 and the high-voltage metal electrode 40. A spray head 72 for spraying the low-temperature non-equilibrium plasma, is arranged on the bottom plate 70. In this exemplary embodiment, the spray head 72 includes at least one titled through holes 73 arranged thereon, such as a plurality of titled through holes 73 distributed in a radial form as shown in FIG. 1.

The round plate 30 is made of stainless steel, an inner screw is formed in the round plate 30, and an outer screw is formed at the periphery of the top of the high-voltage metal electrode 40. The outer screw is may arranged in the inner screw for assembling fixedly the high-voltage metal electrode 40 on the round plate 30.

The orientation base 10 has an inner circular groove 11 for inserting the ceramic pipe 20 into the orientation base 10 and fixing the ceramic pipe 20 at the circular groove 11.

The ceramic pipe 20 has an inner circular groove 21 for inserting the round plate 30 into the ceramic pipe 20 and fixing the round plate 30 at the inner circular groove 21.

The round plate 30 has a plurality of tilted through holes 31 distributed thereon as shown in FIG. 2. The plurality of tilted through holes 31 are communicated with each other. Preferably, the plurality of tilted through holes 31 have a tilted angle of 45 degrees in a same direction to make gas flow there through produce a swirling turbulent flow in the dielectric discharging plasma area A for fully mixing and spraying the produced plasma. The present invention is not limited by the above, if the plurality of tilted through holes 31 have a titled angle in a same direction, the swirling turbulent flow can be produced at different degrees.

The high-voltage metal electrode 40 includes a metal connecter 41 and a tie-in 421 arranged on the top thereof. An inserting hole is arranged in the high-voltage metal electrode 40, and a laddering groove 401 is arranged in the inserting hole. Another inserting hole is arranged in the metal connecter 41, and another laddering groove 411 is arranged in the inserting hole. The metal connecter 41 is inserted into the laddering groove 401 of the high-voltage metal electrode 40, and the tie-in 421 is inserted into the laddering groove 411 of the metal connecter 41. The metal connecter 41 and the tie-in 421 are both made of electric metals. The wire 42 connects with the tie-in 421, and the windpipe 62 is an insulator communicated with outside. The wire 42 is inserted into the windpipe 62 and connected with a power (not shown) such so to transmit an alternating high-frequency high voltage on the high-voltage metal electrode 40. The ceramic pipe 20 is connected to ground and the dielectric discharging plasma area A formed between the high-voltage metal electrode 40 and the ceramic pipe 20, has a first proportional distance. The bottom plate 70 is connected to ground, and the low-temperature non-equilibrium plasma area B formed between the high-voltage metal electrode 40 and the grounding electrode 71, has also a second proportional distance. The first proportional distance of the dielectric discharging plasma area A and the second proportional distance of the low-temperature non-equilibrium plasma area B are decided by the plasma manufacturing gas entered therein and the voltage supplied therein. A ratio of the voltage supplied therein and the distance is 1~5, for example:

If the voltage supplied therein is 5 kv, the distance may be 1~5 mm;

If the voltage supplied therein is 4 kv, the distance may be 0.8~4 mm;

If the voltage supplied therein is 3 kv, the distance may be 0.6~3 mm;

If the voltage supplied therein is 2 kv, the distance may be 0.4~2 mm;

If the voltage supplied therein is 1 kv, the distance may be 0.2~1 mm; the other relation of the supplied therein and the distance can be achieved by analogy.

If the voltage supplied therein is 4 kv, the distance may be 0.8~4 mm;

The orientation base 10 includes a coping 60 arranged on the top thereof. An outer screw is arranged around the top of the orientation base 10, and an inner screw is arranged on the inner surface of the bottom plate of the coping 60. The inner screw of the coping 60 can be coupled with the outer screw of the orientation base 10. The coping 60 is made of polytetrafluoroethylene.

Preferably, for increasing the plasma treatment area and the uniformity of the plasma jet electrode device 1, a rotating base 50 is arranged around the orientation base 10 as shown in FIG. 1. An outer circular groove 12 is arranged around the orientation base 10, and an axletree 13 is arranged at the outer circular groove 12. An inner circular groove 51 is arranged on the inner surface of the rotating base 50 and the inner circular groove 51 is covered on the axletree 13. With rotating the axletree 13, the rotating base 50 can rotate on the surface of the orientation base 10. A bottom plate 70 is arranged under the rotating base 50. An outer screw is arranged around the bottom plate of the rotating base 50, and an inner screw is arranged on the inner surface of the bottom plate 70, such that the outer screw of the rotating base 50 can coupled with the inner screw of the round plate.

If no rotating base 50, the bottom plate 70 can be mounted on the orientation base 10. The orientation base 10 and the bottom plate 70 can be incorporated together. The bottom plate 70 also can be screwed with the orientation base 10.

A spray head 72 is arranged under the bottom plate 70. A protrusion 701 is extending from the bottom plate, and an outer screw is formed around the protrusion 701. An inner screw is formed on the inner surface of the spray head 72 such that the inner screw of the spray head 72 can be screwed with the outer screw of the protrusion 701. A plurality of tilted through holes 73 are arranged on the spray head 72 and distributed in a spreading form or a radial form.

Figure 3:
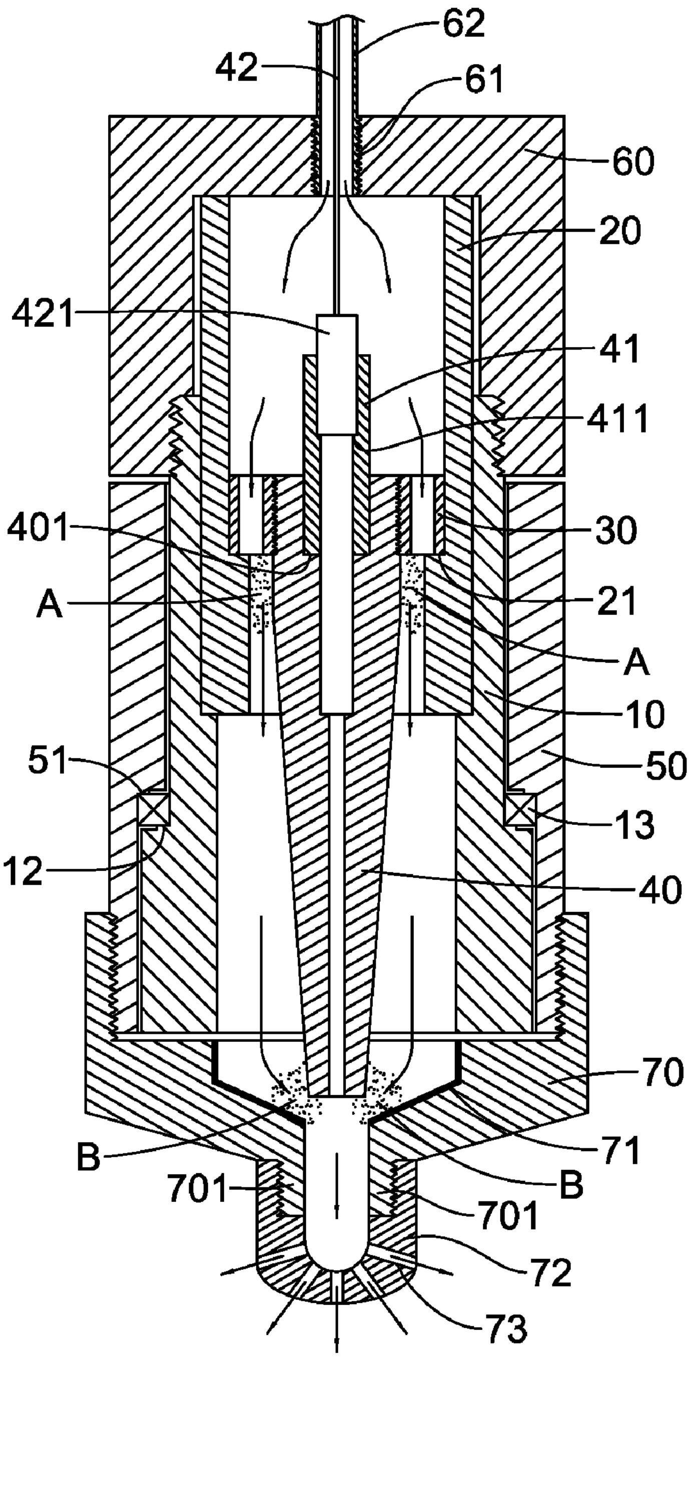
FIG. 3 is schematic, cross-sectional view of plasma operation of the plasma jet electrode device.

Referring to FIG. 3, the present plasma jet electrode device 1 can transmit the alternating high-frequency high voltage on the high-voltage metal electrode 40 through the wire 42, the tie-in 421 and the metal connecter 41. The low-temperature normal-pressure air and the plasma manufacturing gas can enter into the ceramic pipe 20 through the windpipe 62, and pass the plasma produced in the dielectric discharging plasma area A through the tilted through holes 31 of the round plate 30 to form turbulent flow for spraying the plasma. The spraying plasma is made a low-temperature non-equilibrium plasma through the low-temperature non-equilibrium plasma area B and the low-temperature non-equilibrium plasma is sprayed by rotating the spray head 72 and the tilted through holes 73 such that the plasma treatment area is increased, and the uniformity is improved to have an excellent plasma treatment effect.

Figure 4:
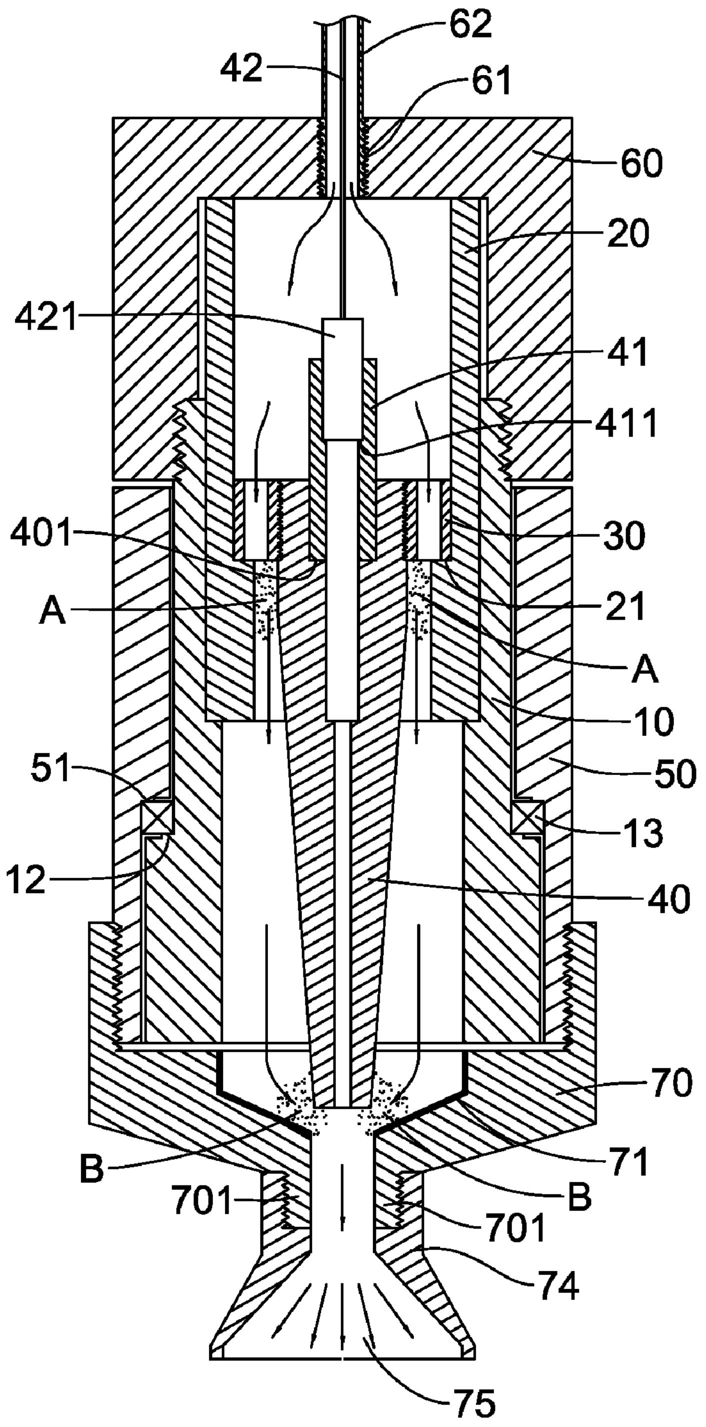
FIG. 4 is a schematic, cross-sectional view of a plasma jet electrode device in accordance with another preferred embodiment of the present invention.

Furthermore, the present spray head 72 can be designed a linear shape as shown in FIG. 4. The low-temperature non-equilibrium plasma is sprayed by the direct-shaped spray head 72 to form a linear plasma treatment area such that the present plasma jet electrode device can be used more widely. The rotating base 50 can be cooperated with the spray head 72 to form a uniform surface plasma treatment area to improve the treatment effect.

Figure 5:
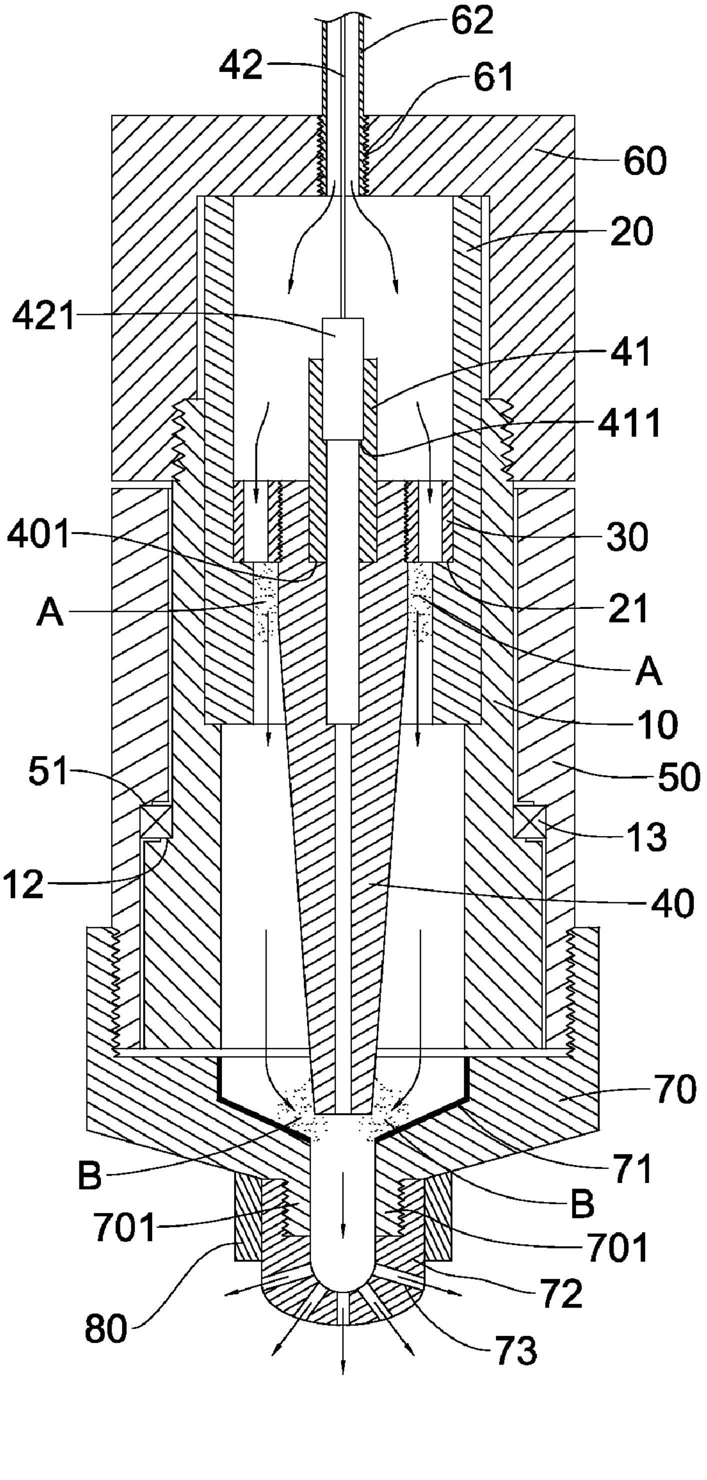
FIG. 5 is a schematic, cross-sectional view of a plasma jet electrode device in accordance with other preferred embodiment of the present invention.

Referring to FIG. 5, the present plasma jet electrode device 1 further includes a magnetic body 80, such as magnet, etc., arranged around the spray head 72. The magnetic body 80 is used to supply a magnetic field to the spray head 72 for increasing the probability of colliding of the electron and the molecule of the plasma passing through the spray head 72 so as to increase the concentration of the low-temperature atmospheric pressure non-equilibrium plasma and improve the plasma treatment effect.

The present plasma jet electrode device 1 may further includes a van flow controller (not shown) for supplying and controlling the van to the low-temperature non-equilibrium plasma area B. The van is organic, inorganic or metal organic plating manufacturing gas (such as Ethyl silicate Tetraethoxy-silicone, oxygen, polythene, methane, ethyne, etc.) or etching manufacturing gas (such as hydrogen, carbon tetrachloride, etc.) to make the plasma jet electrode device 1 using in the plating or etching.

Figure 6:
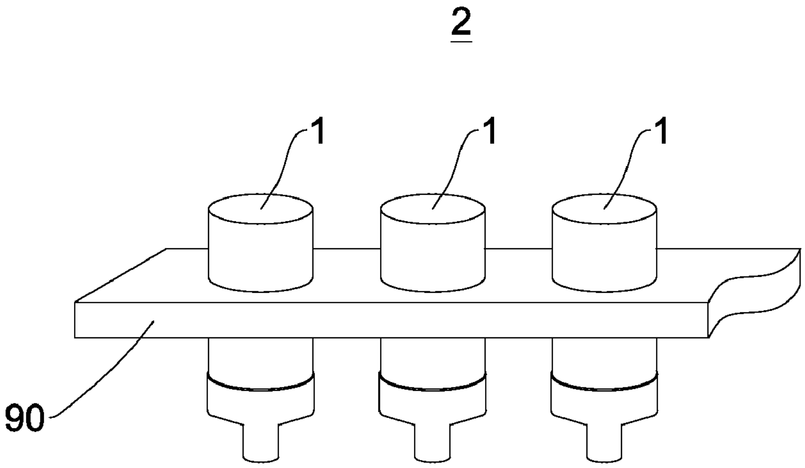
FIG. 6 is a schematic, 3-dimensional view of a plasma jet electrode system in accordance with a preferred embodiment of the present invention.
Figure 7:
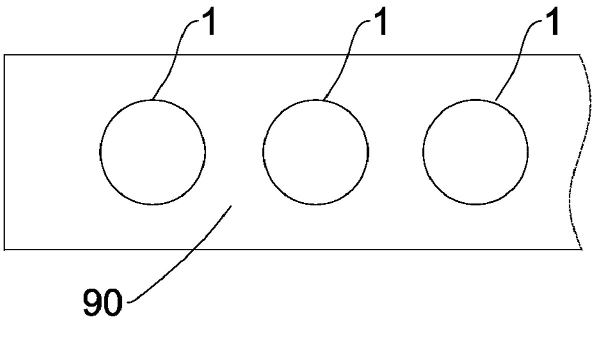
FIG. 7 is a schematic, top view of the plasma jet electrode system of FIG. 6.
Figure 8:
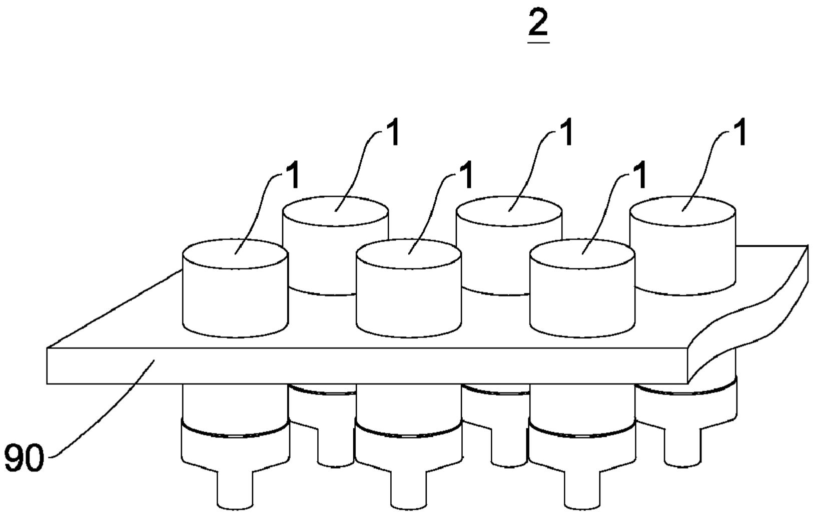
FIG. 8 is a schematic, 3-dimensional view of a plasma jet electrode system in accordance with another preferred embodiment of the present invention.
Figure 9:
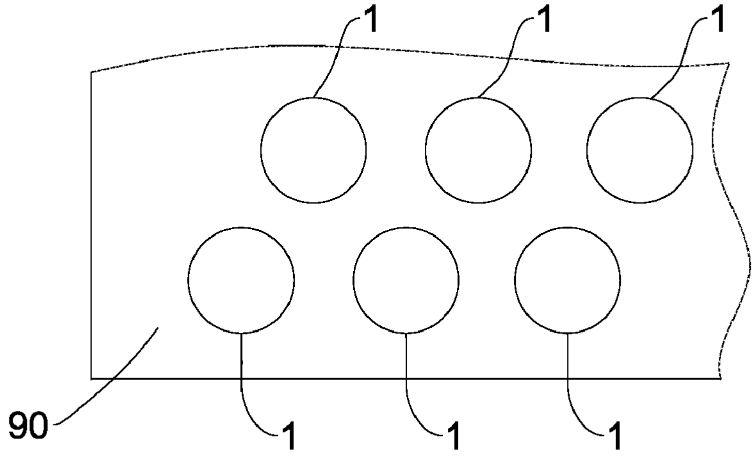
FIG. 9 is a schematic, top view of the plasma jet electrode device of FIG. 8.

Referring to FIGS. 6 and 7, a plasma jet electrode system 2 in accordance with a second preferring embodiment of the present invention is shown. The plasma jet electrode system 2 includes at least one plasma jet electrode device 1, and a frame 90 for fixing at least one plasma jet electrode device 1. The at least one plasma jet electrode device 1 may be arranged linearly as shown in FIG. 7 for need. The at least one plasma jet electrode device 1 may also be arranged in a surface as shown in FIGS. 8 and 9 to increase the low-temperature atmospheric pressure non-equilibrium plasma treatment area.

Figure 10:
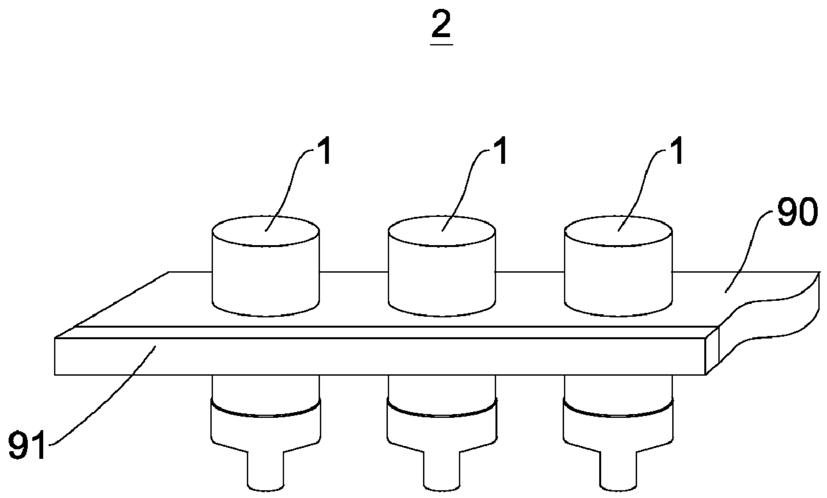
FIG. 10 is a schematic, 3-dimensional view of the plasma jet electrode system having a cooling device.
Figure 11:
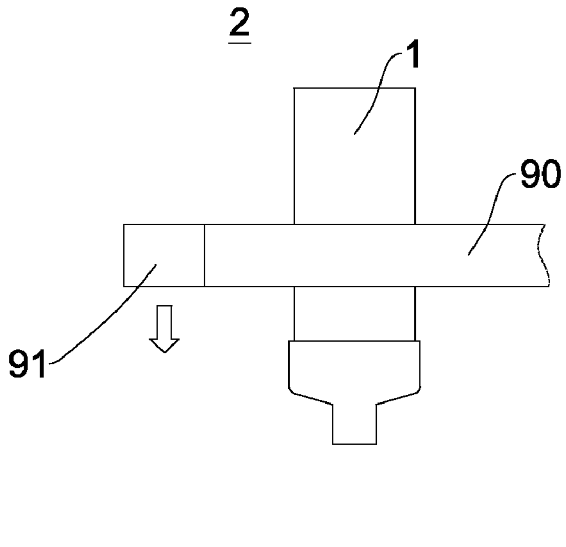
FIG. 11 is a schematic, side cross-sectional view of the plasma jet electrode system of FIG. 10.
Figure 12:
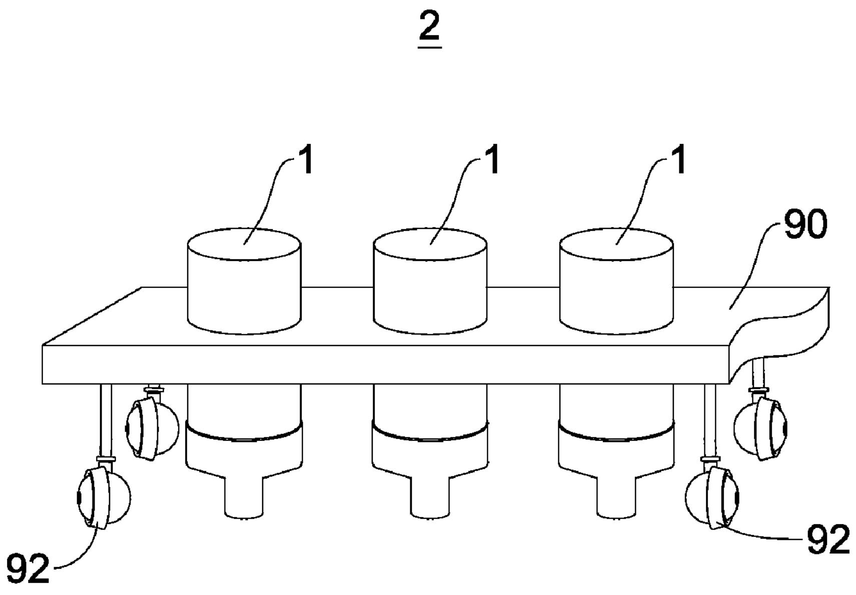
FIG. 12 is a schematic, 3-dimensional view of the plasma jet electrode system having a guiding device.

When the plasma jet electrode system 2 treats the work-piece (not shown), the temperature of the work-piece will increased. Therefore, the present plasma jet electrode system 2 may include also a cooling device 91 as shown in FIGS. 10 and 11. The cooling device 91 is arranged at a side of the frame 90 as shown in FIG. 11. When the frame 90 moves to make the plasma jet electrode device 1 treat the work-piece, the cooling device 91 is an air cooling device, which supplies air flowing downward the work-piece to decrease the temperature of the work-piece.

The present plasma jet electrode system 2 may further includes a guiding device 92, such as an idler wheel, connected with the frame 90 to guide the frame 90 to move in a pre-determined direction for remaining the distance of the plasma jet electrode device 1 and the work-piece such that the plasma jet electrode device can treat the work-piece uniformly and the frame can operate steadily. Furthermore, the guiding device 92 includes an adjustable connecter 920 connected with the frame 90. Since the adjustable connecter 920 can adjust the height, the guiding device 92 can fit various distances of the work-piece and the plasma jet electrode device 1.

The present plasma jet electrode device 1 and the plasma jet electrode system 2 improves the treatment area and the uniformity of the low-temperature atmospheric pressure non-equilibrium plasma such that the plasma jet electrode device can be used more widely, such as cleaning and etching.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein.

Thus, the scope of the claims is not to be limited by the illustrated embodiments.

What is claimed is:

1. A plasma jet electrode device, comprising:
- an orientation base;
- a ceramic pipe arranged in the orientation base;
- a round plate arranged in the ceramic pipe, the round plate having at least one tilted through hole arranged thereon;
- a high-voltage metal electrode arranged in the round plate;
- a dielectric discharging area formed between the high-voltage metal electrode and the ceramic pipe;
- a bottom plate arranged at a bottom end of the orientation base;
- a grounding electrode arranged on an inner surface of the bottom plate;
- a low-temperature non-equilibrium plasma area formed between the grounding electrode and the high-voltage metal electrode;
- a spray head arranged at a bottom end of the bottom plate for spraying low-temperature non-equilibrium plasma.

2. A plasma jet electrode device as claimed in claim 1, further comprising a rotating base arranged around the orientation base for the orientation base being rotatably relative to the rotating base, wherein the bottom plate arranged at a bottom end of the rotating base.

3. The plasma jet electrode device as claimed in claim 1, wherein the dielectric discharging plasma area formed between the high-voltage metal electrode and the ceramic pipe has a first distance, and a ratio of a voltage supplied on the high-voltage metal electrode and the first distance is in a range from 1 to 5.

4. The plasma jet electrode device as claimed in claim 1, wherein the low-temperature non-equilibrium plasma area formed between the high-voltage metal electrode and the grounding electrode has a second distance, and a ratio of the voltage supplied on the high-voltage metal electrode and the second distance is from a range of 1 to 5.

5. The plasma jet electrode device as claimed in claim 1, wherein the orientation base has a coping arranged thereon, the coping has a screw hole and a windpipe inserted into the screw hole, the high-voltage metal electrode has an tie-in arranged on the top thereof, the tie-in is connected with a wire, and the wire is inserted into the windpipe and connected with a high-voltage terminal, a gap is defined between the windpipe and the wire to enter outside air and plasma manufacturing gas into the ceramic through the windpipe for making a reaction.

6. The plasma jet electrode device as claimed in claim 1, wherein the round plate has an inner screw, and the high-voltage metal electrode has an outer screw arranged on the top thereof for coupled with the inner screw of the round plate.

7. The plasma jet electrode device as claimed in claim 6, wherein the round plate has a plurality of tilted through holes each having a tilted angle of 45 degree in a same direction.

8. The plasma jet electrode device as claimed in claim 1, wherein the orientation base has an outer circular groove arranged therearound and an axletree arranged in the outer circular groove, the rotating base has an inner circular groove arranged on the inner surface thereof, the inner circular groove is covered on the axletree for making the orientation base rotatably to the rotating base.

9. The plasma jet electrode device as claimed in claim 1, wherein the spray head has at least one tilted through holes arranged thereon, the plurality of tilted through holes is distributed in a diffuse form or a radial form.

10. The plasma jet electrode device as claimed in claim 1, wherein the spray head has a linear output.

11. The plasma jet electrode device as claimed in claim 1, further comprising a magnetic body arranged around the spray head to supply a magnetic field to the spray head.

12. The plasma jet electrode device as claimed in claim 1, wherein the high-voltage metal electrode is a hollow column.

13. The plasma jet electrode device as claimed in claim 1, further comprising a van flow controller configured for supplying and controlling a van to the low-temperature non-equilibrium plasma area such that the plasma jet electrode device can be used for plating or etching, the van of the van flow controller is selected from original, inorganic or metal organic plating manufacturing gases and etching manufacturing gases.

14. The plasma jet electrode system, comprising at least one plasma jet electrode device as claimed in claim 1, and a frame configured for fixing the at least one plasma jet electrode device.

15. The plasma jet electrode system as claimed in claim 14, further comprising a plurality of plasma jet electrode device arranged in a line or a surface and on the frame.

16. The plasma jet electrode system as claimed in claim 14, further comprising a cooling device arranged at a side of the frame to be configured for work-pieces, which is treated by the plasma jet electrode device.

17. The plasma jet electrode system as claimed in claim 16, the cooling device is an air cooling device.

18. The plasma jet electrode system as claimed in claim 14, further comprising a guiding device arranged under the bottom plate of the frame to guide the frame to move in a predetermined direction.

19. The plasma jet electrode system as claimed in claim 18, wherein the guiding device is an idler wheel.

20. The plasma jet electrode system as claimed in claim 18, wherein the guiding device has an adjustable connecter connected with the bottom plate of the frame.

21. The plasma jet electrode system as claimed in claim 14, wherein the at least one plasma jet electrode device further comprises a rotating base arranged around the orientation base for the orientation base being rotatably relative to the rotating base, wherein the bottom plate arranged at a bottom end of the rotating base.

* * * * *